United States Patent [19]

Kloss et al.

[11] Patent Number: 5,403,526
[45] Date of Patent: Apr. 4, 1995

[54] PROCESS FOR PREPARING BENZO(A)PYRENE-FREE, CARBON-CONTAINING, REFRACTORY CERAMIC MATERIALS

[75] Inventors: Gunnar Kloss, Mülheim-Kärlich; Bernd Epstein, Kadenbach; Achim Weber, Aachen, all of Germany

[73] Assignee: Radex-Heraklith Industriebeteiligungs Aktiengesellschaft, Austria

[21] Appl. No.: 876,195

[22] Filed: Apr. 30, 1992

[30] Foreign Application Priority Data

May 1, 1991 [DE] Germany .................. 41 14 210.1

[51] Int. Cl.⁶ ............................................ C04B 35/035
[52] U.S. Cl. ................................. 264/29.1; 264/29.5; 264/63; 264/109; 524/59; 524/63
[58] Field of Search ................ 264/63, 29.1, 29.5, 264/109; 524/59, 63

[56] References Cited

U.S. PATENT DOCUMENTS

| 4,028,293 | 6/1977 | van den Berg | 524/59 |
| 4,521,357 | 6/1985 | Kernion | 264/63 |
| 4,877,761 | 10/1989 | Chmiel | 501/109 |

FOREIGN PATENT DOCUMENTS 8401337 11/1985 Netherlands ............ 264/63

*Primary Examiner*—James Derrington
*Attorney, Agent, or Firm*—John F. A. Earley; John F. A. Earley, III

[57] ABSTRACT

The present invention pertains to a process for preparing a benzo(a)pyrene-free, carbon-containing, refractory ceramic material that can subsequently be used for preparing ceramic preforms.

38 Claims, No Drawings

PROCESS FOR PREPARING BENZO(A)PYRENE-FREE, CARBON-CONTAINING, REFRACTORY CERAMIC MATERIALS

The present invention pertains to a process for preparing a benzo(a)pyrene-free, carbon-containing, refractory ceramic material that can subsequently be used for preparing ceramic preforms.

The impregnation of refractory materials and preforms with coal tar products, such as tar or pitch, has been known for a long time. It is employed above all to increase the resistance to infiltration or resistance to corrosive slags of the corresponding refractory ceramic products. For impregnation, the impregnating medium is adjusted to a certain viscosity above its melting point by means of a heating device in order to subsequently effectively fill the pore system with pitch or tar in a vacuum/pressure process.

Especially coal tar pitches, sometimes in combination with curable synthetic resins, are used for this purpose. However, the said impregnating materials should be classified as hazardous for health because of their relatively high content of polycyclic aromatic substances. This applies especially to the benzo(a)pyrene present in coal tar or pitch, which is considered to be the prototype of the polycyclic aromatic hydrocarbons. Investigations have revealed that this carcinogen causes cancer.

Therefore, pitch or tar is now increasingly replaced exclusively with synthetic resins as binder. Even though this eliminates the problem of polycyclic aromatics, the hydrocarbon residue formed from synthetic resins is less resistant to oxygen, for structural reasons, than the coke formed from pitch or tar. This leads to poorer wear properties of synthetic resin-bound, carbon-containing refractory materials. Another disadvantage of synthetic resins is their high price.

Even though it would also be possible to prepare benzo(a)pyrene-free ceramic materials by using bitumen as the binder, it is disadvantageous in this case that suitable bitumens reach a sufficiently low viscosity for homogeneously mixing the binder with the ceramic matrix material and for wetting the individual granules only at temperatures that are markedly higher than those selected for pitch or tar. While coal tar pitch has a viscosity of ca 3.0 Pas at 150° C. the viscosity of a bitumen at this temperature is much higher. To reach similarly low viscosity values as in the case of the use of coal tar pitch, it would therefore be necessary to heat the bitumen to temperatures above 250° C.

Therefore, the basic task of the present invention is to provide a process for preparing a carbon-containing, refractory ceramic material that is free of benzo(a)pyrene as completely as possible and permits processing at the lowest possible temperatures, which should not preferably be higher than in the case of the use of coal tar pitch.

The present invention is based on the discovery that the viscosity of bitumen can be markedly reduced in the temperature range of 170°-300° C. if the bitumen is used in combination with a synthetic resin, especially a novolak resin.

It was also recognized that in order to fully exploit the desired reduction of viscosity, the use of any type of curing agent should be avoided, because such curing agents again exert a viscosity-increasing (stiffening) effect at temperatures of ca. 180° C.

In its most general embodiment, the process for preparing a benzo(a)pyrene-free, carbon-containing, refractory ceramic material comprises the following steps:

a granular ceramic matrix material is first heated to a temperature of between 170° C. and 300° C., after which 0.1 to 5 wt. % of a powdered synthetic resin is mixed with the ceramic matrix material, 0.1 to 5 wt. % of a bitumen of liquid consistency, heated to 150°-220° C., is subsequently mixed with the mixture thus prepared, wherein all components should occur with the most homogeneous distribution possible to make it possible to obtain a homogeneous structure at the time of the subsequent molding. An alternative embodiment with a synthetic resin-bitumen mixture is described in claim 2.

The amounts of the synthetic resin and the bitumen given above are always related to the total mixture.

As was described, a marked reduction of the viscosity of the bitumen is achieved by the combination of synthetic resin and bitumen, so that even at temperatures of between 170° C. and 240° C., the bitumen is so liquid that it can be added homogeneously, and another advantage, namely, improved wetting of the refractory particles with the synthetic resin-bitumen mixture, can also be observed at the same time.

The bitumen-synthetic resin mixture is characterized by high adhesive forces, which eliminates the risk of the formation of pressed layers during the subsequent molding process.

The material prepared according to the process described is free of benzo(a)pyrene according to the legal regulations. A benzo(a)pyrene content, introduced by the bitumen, of below 0.5 mg/kg was determined in experiments. The material is consequently much less hazardous for the environment and for health than the material bound with pitch or tar.

The use of phenolic resin, especially novolak resin, was found to be particularly advantageous. The resin is characterized by a flow path shorter than 150 mm.

The residual carbon formed from the bitumen during coking has a predominantly linear structure. By adding the synthetic resin, which dissolves in the bitumen at temperatures above ca. 150° C., a carbon skeleton, which has spatially crosslinked structures and is essential for the binding of the refractory matrix material, is formed during coking. Consequently, the strength and wear resistance of a material prepared with the use of a synthetic resin-bitumen binder are markedly better than the strength and wear resistance of a carbon-containing refractory material bound exclusively with bitumen.

To further optimize the carbon skeleton, it is suggested that a bitumen with a coking residue according to Conradson exceeding 35 wt. % and preferably exceeding 45 wt. % be used. Higher carbon yield is thus achieved, which is comparable to the carbon yield reached with, e.g., coal tar pitch (ca. 45 wt. %).

The use of a resin with short flow path (preferably <30 mm) also increases the carbon yield after coking and generally improves the wear resistance of the material.

The percentage of resin within the total amount of resin-bitumen may be 1–50% and preferably 10–30%. The total amount of resin-bitumen is usually 2–7 wt. % and preferably 2.5–3.5 wt. %, always related to the total mixture.

Further advantageous embodiment variants include:
the addition of the synthetic resin in an amount of 0.1–2.0 wt. %,
addition of the bitumen in an amount of 2.0–3.0 wt. %,
addition of a very fine component (<100 microns) of the refractory matrix material to the mixture, preferably after the bitumen had been mixed in. Higher packing density can thus be achieved at the time of the subsequent molding. Together with a correspondingly high carbon yield, this leads to a reduction of the subsequent burnoff loss during annealing and/or during firing and during use.

The very fine component may be added in amounts of up to 30 wt. %, and preferably up to 25 wt. %.

A solid, carbon-containing component, e.g., in the form of carbon black, coke, and/or graphite, may also be added to the mixture. This should also preferably be done after mixing with the bitumen. This carbon carrier exerts an additional wear-inhibiting effect. The properties of the material are further improved in terms of the slag resistance. The preferred amounts added are:
carbon black: up to 3.0 wt. %,
graphite: up to 10.0 wt. %.

The addition of elementary sulfur in amounts of between 0.1 and 3 wt. % also proved to be advantageous, because sulfur has a viscosity-reducing effect and also increases the carbon yield. In addition, sulfur acts as a crosslinking agent.

The ceramic matrix material may be any common ceramic material that is bound with carbon. Magnesite with a particle size of up to 6 mm is preferably used.

The present invention will be explained in greater detail below on the basis of an exemplary embodiment. (The amounts added are always related to the matrix material.)

A magnesia matrix material (without very fine component) with a particle size of up to 6 mm is heated to 250° C.

Then, 1.0 wt. % novolak resin (without curing agent) with a flow path shorter than 100 mm is mixed in.

3.0 wt. % of a bitumen preheated to 210° C. with a coking residue above 45% is subsequently added.

Finally, the very fine component of the matrix material, which was separated at the beginning, 3.0 wt. % carbon black, and 1.0 wt. % elementary sulfur are added.

All components are mixed to make a homogeneous mixture. The material is then processed into preforms (bricks), and the bricks are heat-treated at 300° C.

The magnesite bricks thus prepared possess the following properties:
Apparent density: >3.06 g/cm³
Open porosity: <7.0%
Cold compression strength: >40 MPa
Warm compression strength: >20 MPa.

We claim:
1. Process for preparing a benzo(a)pyrene-free, carbon-containing, refractory ceramic material, comprising the following steps:
   1.1. heating a granular refractory ceramic matrix material to a temperature of between 170° C. and 300° C.,
   1.2. adding to the heated ceramic matrix material a powdered synthetic resin containing no curing agents, the powdered synthetic resin being 0.1 to 5.0 wt. % of the refractory ceramic material, and
   1.3. adding a bitumen of viscous consistency, preheated to 150°–220° C., to the heated ceramic matrix material, the bitumen being 0.1 to 5.0 wt. % of the refractory ceramic material.

2. Process for preparing a benzo(a)pyrene-free, carbon-containing, refractory ceramic material, comprising the following steps:
   2.1. heating a granular refractory ceramic matrix material to a temperature of between 170° C. and 300° C. and
   2.2. adding a mixture, preheated to 150°–220° C., of a synthetic resin containing no curing agents and a bitumen, into the ceramic matrix material, the synthetic resin and the bitumen each being 0.1–5.0 wt. % of the refractory ceramic material.

3. Process in accordance with claim 1, providing that a phenolic resin is used as the synthetic resin.

4. Process in accordance with claim 1, providing that a novolak resin is used as the synthetic resin.

5. Process in accordance with claim 1, providing that the synthetic resin is 0.1–2.0 wt. % of the refractory ceramic material.

6. Process in accordance with claim 1, providing that the bitumen is 2.0–3.0 wt. % of the refractory ceramic material.

7. Process in accordance with claim 1, providing that the bitumen has a Conradson coking residue above 35 wt. % with respect to the added bitumen.

8. Process in accordance with claim 8, providing that the bitumen has a Conradson coking residue above 45 wt. % with respect to the added bitumen.

9. Process in accordance with claim 1, wherein after addition of the bitumen, a very fine (<100 microns) ceramic matrix material is homogeneously added to the heated ceramic matrix material.

10. Process in accordance with claim 1, providing that a solid, carbon-containing component in the form of carbon black, coke, and/or graphite is added to the heated.

11. Process in accordance with claim 10, providing that the carbon black component is added in an amount of up to 3 wt. %.

12. Process in accordance with claim 10 providing that graphite in an amount of up to 20 wt. % of the refractory ceramic material is added to the heated ceramic matrix material.

13. Process in accordance with claim 1, providing that elementary sulfur in an amount of between 0.1 and 3 wt. % of the refractory ceramic material is added to the heated ceramic matrix material.

14. Process in accordance with claim 1, providing that the bitumen is added in two portions, and a very fine (<100 microns) ceramic matrix material, a solid, carbon-containing component in the form of carbon black, coke, and/or graphite, and/or further additives are added between the additions of the first and second portions of bitumen.

15. Process in accordance with claim 1, providing that magnesite with a particle size of up to 6 mm is used as the ceramic matrix material.

16. Process in accordance with claim 1, providing that the refractory ceramic material including matrix material, synthetic resin, and bitumen, and, if desired, further additives, is subsequently processed into preforms.

17. Process in accordance with claim 16, providing that the preforms are subsequently heat-treated.

18. Process in accordance with claim 17, providing that the heat treatment is carried out at temperatures of between 300° C. and 350° C.

19. Process in accordance with claim 2, providing that a phenolic resin is used as the synthetic resin.

20. Process in accordance with claim 2, providing that a novolak resin is used as the synthetic resin.

21. Process in accordance with claim 2, providing that the synthetic resin is 0.1–2.0 wt. % of the refractory ceramic material.

22. Process in accordance with claim 2, providing that the bitumen is 0.1–2.0 wt. % of the refractory ceramic material.

23. Process in accordance with claim 2, providing that the bitumen has a Conradson coking residue above 35 wt. % with respect to the added bitumen.

24. Process in accordance with claim 2, providing that the bitumen has a Conradson coking residue above 45 wt. % with respect to the added bitumen.

25. Process in accordance with claim 2, providing that after addition of the bitumen, a very fine (<100 Microns) ceramic matrix material is homogeneously added to the heated ceramic matrix material.

26. Process in accordance with claim 2, providing that a solid, carbon-containing component in the form of carbon black, coke, and/or graphite is added to the heated ceramic matrix material.

27. Process in accordance with claim 2, providing that a solid, carbon-containing component in the form of carbon black in an amount of up to 3 wt. % of the refractory ceramic material is added to the heated ceramic matrix material.

28. Process in accordance with claim 2, providing that a solid, carbon-containing component in the form of graphite in an amount of up to 20 wt. % of the refractory ceramic material is added to the heated ceramic matrix material.

29. Process in accordance with claim 2, providing that elementary sulfur in an amount of between 0.1 and 3 wt. % of the refractory ceramic material is added to the heated ceramic matrix material.

30. Process in accordance with claim 2, providing that magnetite with a particle size of up to 6 mm is used as the ceramic matrix material.

31. Process in accordance with claim 2, providing that the refractory ceramic material including the refractory matrix material, synthetic resin, and bitumen, and, if desired, further additives, is subsequently processed into preforms.

32. Process in accordance with claim 31, providing that the preforms are subsequently heat-treated.

33. Process in accordance with claim 32, providing that the heat treatment is carried out at temperatures of between 300° C. and 350° C.

34. Process for preparing a benzo(a)pyrene-free, carbon-containing, refractory ceramic material, comprising the following steps
   heating a granular refractory ceramic matrix material to a temperature of between 170° C. and 300° C.,
   adding sequentially to the heated ceramic matrix material a first component of a binder and a second component of a binder, the binder consisting essentially of the first component and the second component, the first component being a powdered synthetic resin containing no curing agents, the second component being a bitumen of viscous consistency, preheated to 150°–200° C., the powdered synthetic resin being 0.1 to 5.0 wt. % of the refractory ceramic material, and the bitumen being 0.1 to 5.0 wt. % of the refractory ceramic material.

35. Process in accordance with claim 34,
   providing that a phenolic resin is used as the synthetic resin,
   providing that the synthetic resin is 0.1–2.0 wt. % of the refractory ceramic material,
   providing that the bitumen is 2.0–3.0 wt. % of the refractory ceramic material,
   providing that the bitumen has a Conradson coking residue above 45 wt. % with respect to the added bitumen,
   providing that after addition of the bitumen, a very fine (<100 microns) ceramic matrix material is homogeneously added to the heated ceramic matrix material,
   providing that a solid, carbon-containing component in the form of carbon black, coke, and/or graphite is added to the heated ceramic matrix material,
   the carbon black component being in an amount of up to 3 wt. % of the refractory ceramic material,
   the graphite being in an amount of up to 10 wt. % of the refractory ceramic material,
   providing that elementary sulfur in an amount of between 0.1 and 3 wt. % of the refractory ceramic material is added to the heated ceramic matrix material,
   providing that the bitumen is added in two portions, and the very fine (<100 microns) ceramic matrix material, the solid, carbon-containing component, and/or further additives are added between the additions of the first and second portions of bitumen,
   providing that magnetite with a particle size of up to 6 mm is used as the ceramic matrix material,
   providing that the refractory ceramic material including the refractory matrix material, synthetic resin, and bitumen, and , if desired, further additives, is subsequently processed into preforms, and
   providing that the preforms are subsequently heat-treated at temperatures of between 300° C. and 350° C.

36. Process for preparing a benzo(a)pyrene-free, carbon-containing, refractory ceramic material, comprising the following steps:
   heating a granular refractory ceramic matrix material to a temperature of between 170° C. and 300° C., and
   adding a binder, preheated to 150°–220° C., consisting essentially of 0.1–5.0 wt. % of a synthetic resin and 0.1–5.0 wt. % of a bitumen, both related to the refractory ceramic material, into the ceramic matrix material.

37. Process in accordance with claim 36,
   providing that a phenolic resin is used as the synthetic resin,
   providing that a synthetic resin containing no curing agent is used,
   providing that the synthetic resin is 0.1–2.0 wt. % of the refractory ceramic material,
   providing that the bitumen is 2.0–3.0 wt. % of the refractory ceramic material,
   providing that the bitumen has a Conradson coking residue above 45 wt. % with respect to the added bitumen,
   providing that after addition of the bitumen, a very fine (<100 microns) ceramic matrix material is homogeneously added to the heated ceramic matrix material, providing that a solid, carbon-containing component in the form of carbon black, coke, and/or graphite is added to the heated ceramic matrix material, the carbon black component being in an amount of up to 3 wt. % of the refractory ceramic material, the graphite being in an amount of up to 10 wt. % of the refractory ceramic material, providing that elementary sulfur in an amount of between 0.1 and 3 wt. % of the refractory ceramic material is added to the heated ceramic matrix material, providing that magnetite with a particle size of up to 6 mm is used as the ceramic matrix material, providing that the refractory ceramic matrix material including the refractory matrix material, synthetic resin, and bitumen, and , if desired, further additives, is subsequently processed into preforms, and providing that the preforms are subsequently heat-treated at temperatures of between 300° C. and 350° C.

38. Process for preparing substantially benzo(a)pyrene-free, carbon-containing, refractory ceramic material, comprising the following steps heating a granular refractory ceramic matrix material to a temperature of between 170° C. and 300° C., mixing into the heated ceramic matrix material a powdered synthetic resin containing no curing agents, the powdered synthetic resin being 0.1 to 5.0 wt. % of the refractory ceramic matrix material, and pre-heating to 150°–220° C. bitumen of viscous consistency having a Conradson coking residue greater than 35 wt. % with respect to the bitumen, mixing 0.1 to 5.0 wt. % of the pre-heated bitumen, with respect to the refractory ceramic matrix material, into the heated refractory ceramic matrix material, and providing that a benzo(a)pyrene content of the heated ceramic matrix material/resin/pre-heated bitumen mixture that is introduced by the bitumen, is less than 0.5 mg/kg.

* * * * *